United States Patent
Imazu et al.

(10) Patent No.: US 11,421,719 B2
(45) Date of Patent: Aug. 23, 2022

(54) FASTENING CLIP WITH VISUAL SEAL

(71) Applicant: ILLINOIS TOOL WORKS INC., Glenview, IL (US)

(72) Inventors: Norikaze Imazu, Toyota (JP); Jason M. Zander, Roberts, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/132,875

(22) Filed: Dec. 23, 2020

(65) Prior Publication Data

US 2021/0215177 A1    Jul. 15, 2021

Related U.S. Application Data

(60) Provisional application No. 62/959,227, filed on Jan. 10, 2020.

(51) Int. Cl.
*F16B 5/00* (2006.01)
*F16B 5/06* (2006.01)

(52) U.S. Cl.
CPC .......... *F16B 5/0084* (2013.01); *F16B 5/0664* (2013.01)

(58) Field of Classification Search
CPC .... F16B 5/0084; F16B 5/0664; F16B 5/0642; F16B 21/02
See application file for complete search history.

(56) References Cited

U.S. PATENT DOCUMENTS

| | | | | |
|---|---|---|---|---|
| 4,938,378 A | * | 7/1990 | Kraus | B62D 25/24 220/789 |
| 6,296,136 B1 | * | 10/2001 | Huet | B62D 25/24 138/89 |
| 6,557,208 B2 | * | 5/2003 | Huet | B62D 25/24 16/2.1 |
| 6,974,292 B2 | * | 12/2005 | Hansen | F16B 21/086 24/458 |
| 7,108,269 B2 | * | 9/2006 | Benkel | B62D 25/24 16/2.1 |
| 9,969,438 B2 | * | 5/2018 | Sato | F16J 15/025 |
| 10,385,901 B2 | * | 8/2019 | Steltz | F16B 5/06 |
| 2008/0052878 A1 | * | 3/2008 | Lewis | F16B 19/004 24/297 |
| 2017/0102018 A1 | * | 4/2017 | Kanie | F16B 5/0657 |
| 2017/0335877 A1 | * | 11/2017 | Steltz | F16B 5/0621 |
| 2018/0066694 A1 | * | 3/2018 | Kurokawa | F16B 21/04 |
| 2019/0118731 A1 | * | 4/2019 | Leverger | B60J 5/0416 |
| 2019/0176719 A1 | * | 6/2019 | Lee | F16B 21/02 |

* cited by examiner

*Primary Examiner* — David M Upchurch
(74) *Attorney, Agent, or Firm* — Quarles & Brady LLP

(57) ABSTRACT

A fastening clip is provided for fastening to one or more support structures. The fastening clip includes a clip body and a seal. The seal is disposed around a peripheral edge of the clip body and includes a first end and a sealing foot, the first end engaging the clip body, the sealing foot projecting from the first end to a second end such that the second end is disposed radially outwardly from the first end, and the second end being radially aligned with or disposed radially inwardly from the peripheral edge of the collar in an uninstalled configuration. In an installed configuration, the circumferential seal is configured to flex against a support structure in response to applied pressure between the seal and the support structure so that the second end is disposed radially outwardly from the peripheral edge of the collar.

17 Claims, 7 Drawing Sheets

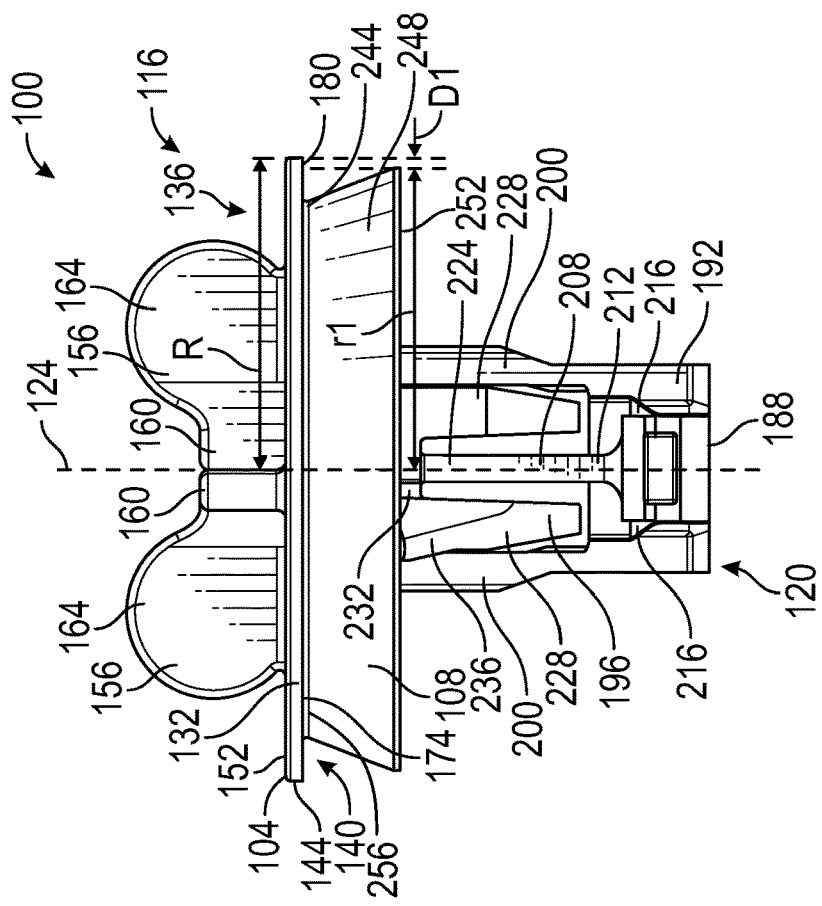
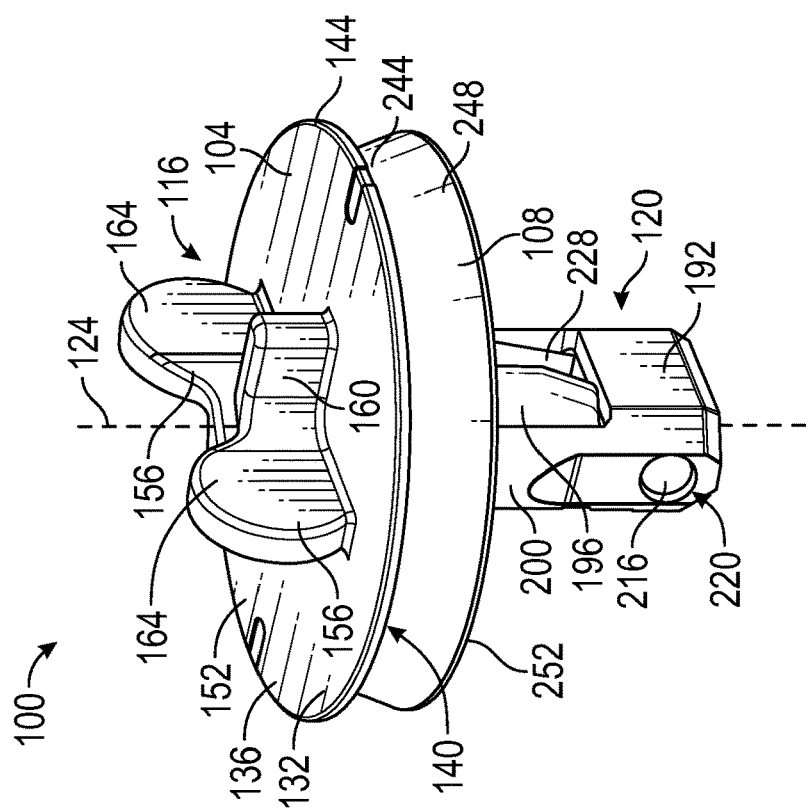
FIG. 2
FIG. 1

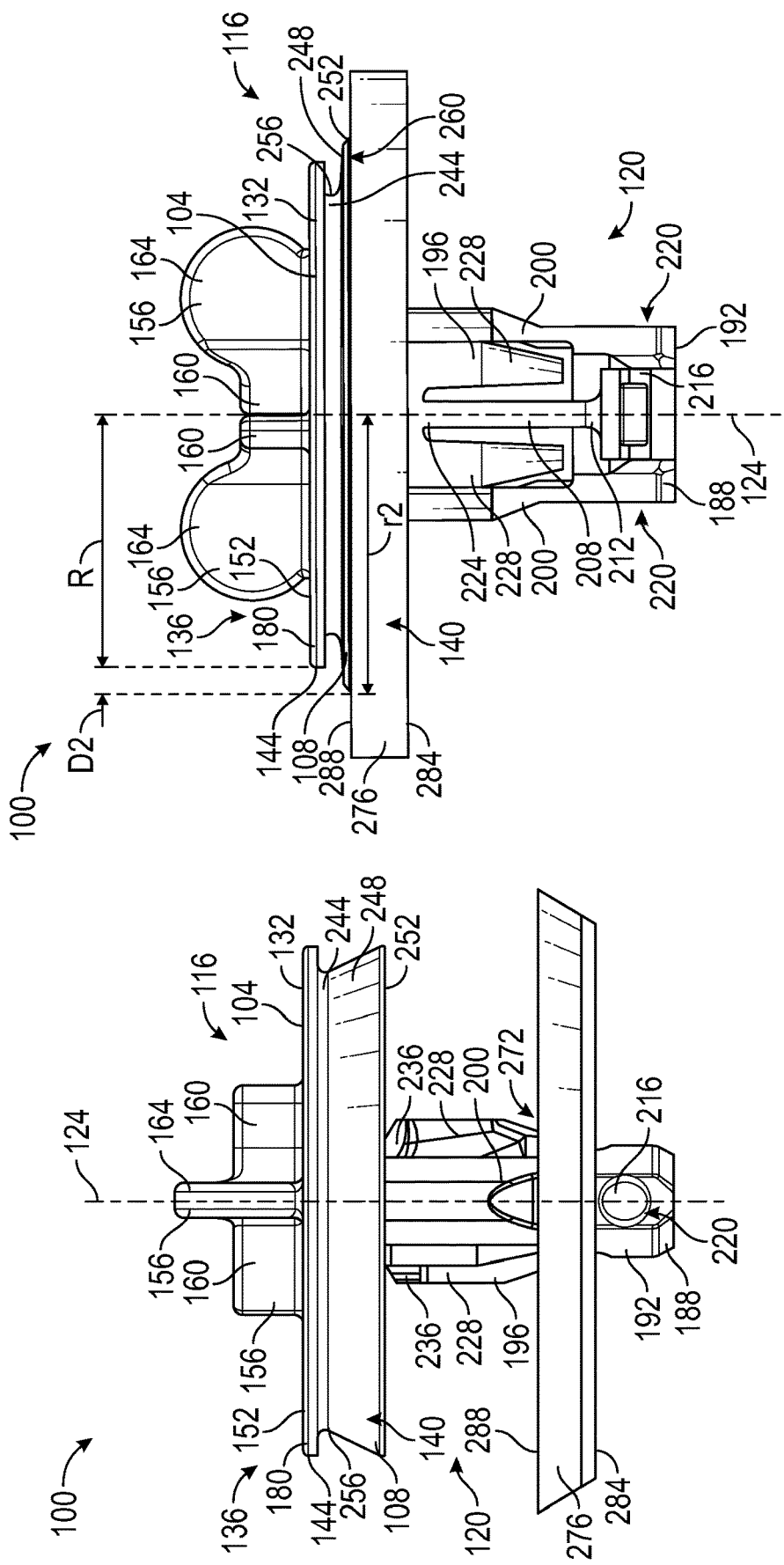

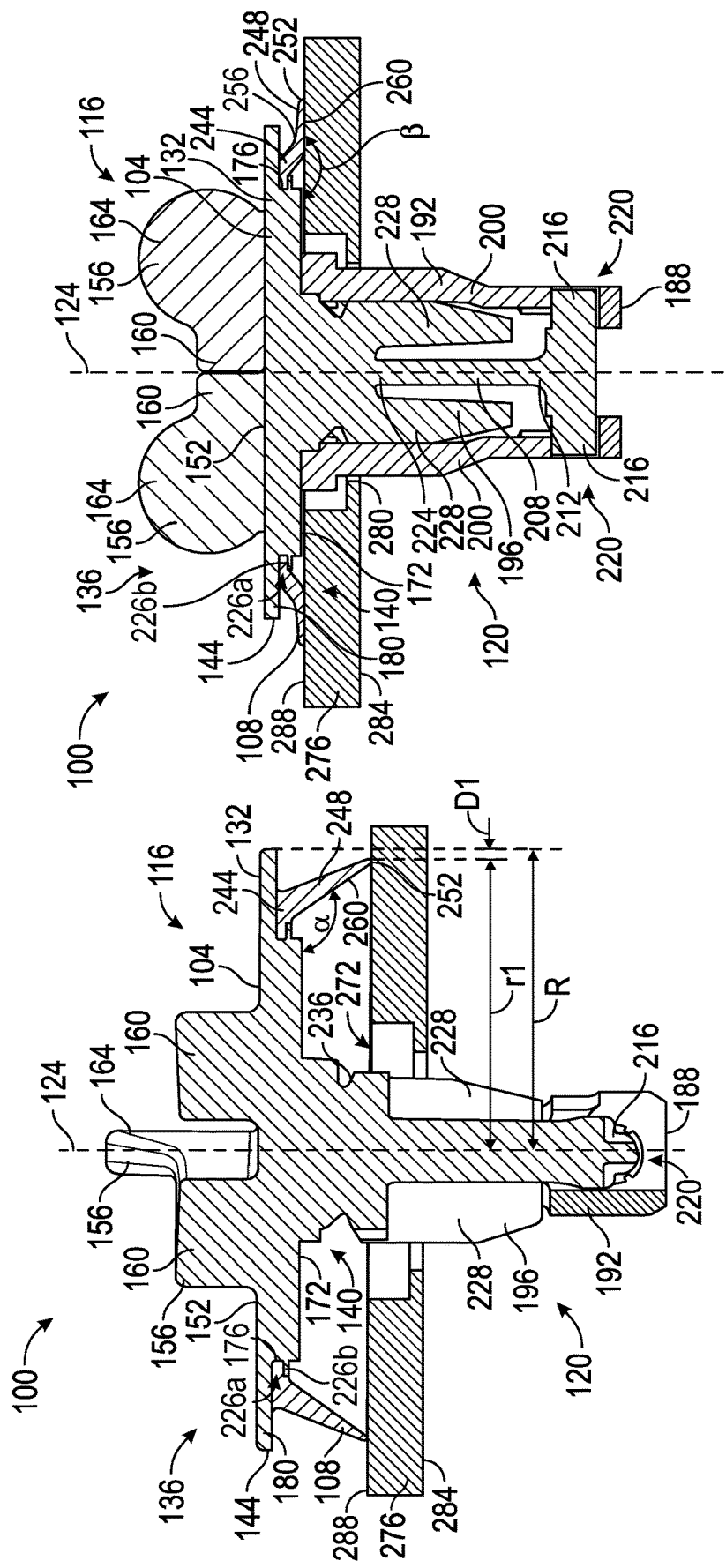

FASTENING CLIP WITH VISUAL SEAL

CROSS REFERENCE TO RELATED APPLICATIONS

This application relates to and claims priority to U.S. Provisional Application No. 62/959,227 filed on Jan. 10, 2020, which is hereby incorporated by reference in its entirety.

FIELD OF THE DISCLOSURE

Embodiments of the present disclosure generally relate to seals for fasteners, and more particularly, to seals that provide visual verification of assembly.

BACKGROUND

Clips are commonly used to secure one or more structures, panels, or components to one or more mating structures, panels, or components. Some existing clips have one or more pre-determined installation positions. That is, the clip must be positioned in one of the installation positions relative to an underlying structure to be securely fastened to the structure. These positions may be indicated with markings on the structure and/or on the clip itself. However, having only select installation positions can be limiting to consumers. Therefore, a need exists for a clip that provides visual indication of achieving an installation configuration without being restricted to specific installation positions.

SUMMARY

In one embodiment, a fastening clip for insertion into an opening of one or more support structures is disclosed. The fastening clip includes a clip body including a base portion and a fastening portion. The base portion includes a collar with a first side and an opposing second side, the first side having a first surface, the second side having second surface surrounded by an annular shoulder that is disposed radially inwardly from a peripheral edge of the collar. The annular shoulder defines a reduced thickness outer annular lip, and the fastening portion extends from the second side of the collar. The fastening clip further includes a seal disposed circumferentially around the collar, the seal having a proximate end engaging the annular shoulder of the collar, and a sealing foot projecting from the proximate end to a free edge such that the free edge is disposed radially outwardly from the proximate end. A sealing surface of the sealing foot forms a first angle with the second surface of the collar in an uninstalled configuration. The fastening portion of the clip body includes at least one locking protuberance that is configured to abut a lower surface of a support structure adjacent an opening to lock the fastening clip within the opening of the support structure in an installed configuration. Further, in the uninstalled configuration, the free edge of the seal is at a first radial distance from a central axis of the fastening clip, the first radial distance being less than or equal to a radius of the peripheral edge from the central axis. In the installed configuration, the seal is configured to flex against an upper surface of the support structure in response to applied pressure between the seal and the support structure so that the free edge of the seal is at a second radial distance from the central axis of the fastening clip, and the sealing surface of the sealing foot forms a second angle with the second surface of the collar, the second radial distance being greater than the radius of the peripheral edge, and the second angle being greater than the first angle.

In another embodiment, a fastening clip for fastening to one or more support structures is disclosed. The fastening clip includes a clip body having a base portion and a fastening portion, the base portion including a collar having a peripheral edge. The fastening clip further includes a circumferential seal disposed at least partially around the collar and including a first end and a sealing foot, the first end engaging the collar. The sealing foot projects from the first end to a second end such that the second end is disposed radially outwardly from the first end, and the second end being radially aligned with or disposed radially inwardly from the peripheral edge of the collar in an uninstalled configuration. The fastening portion of the clip body is configured to engage a support structure in an installed configuration. Further, in the installed configuration, the circumferential seal is configured to flex against the support structure in response to applied pressure between the seal and the support structure so that the second end is disposed radially outwardly from the peripheral edge of the collar.

In another embodiment, a fastening clip for insertion into an opening of one or more support structures is disclosed. The fastening clip includes a clip body including a base portion and a fastening portion, the base portion including a collar having a first side and an opposing second side. The first side has a first surface and the second side has a second surface surrounded by an annular shoulder that is disposed radially inwardly from a peripheral edge of the collar. The peripheral edge of the collar has a radius measured form a central axis of the fastening clip. The annular shoulder defines a reduced thickness outer annular lip, and the fastening portion extends from the second side of the collar. The fastening clip further includes a seal disposed circumferentially around the collar, the seal having a proximate end engaging the annular shoulder of the collar. A sealing foot projects from the proximate end to a distal end such that the distal end is disposed radially outwardly from the proximate end, and a sealing surface of the sealing foot forms a first angle with the second surface of the collar. The fastening portion of the clip body includes at least one locking protuberance that is configured to engage a lower surface surrounding an opening of a support structure to lock the fastening clip within the opening of the support structure in an installed configuration. In an uninstalled configuration, the distal end of the seal is at a first radial distance from the central axis of the fastening clip, the first radial distance being less than or equal to the radius of the peripheral edge. In the installed configuration, the seal is configured to flex against an upper surface the support structure in response to applied pressure between the seal and the support structure so that the distal end of the seal is at a second radial distance from the central axis, and the sealing surface of the sealing foot forms a second angle with the second surface of the collar, the second radial distance being greater than the radius of the peripheral edge, and the second angle being greater than the first angle. The fastening clip is configured to be rotated between the installed configuration and the uninstalled configuration. Rotating the fastening clip from the uninstalled configuration to the installed configuration establishes engagement between the at least one locking protuberance and the lower surface of the support structure and applies pressure between the seal and the upper surface of the support structure. Further, the seal is configured to flex against the upper surface of the support structure in response to applied pressure between the seal and the upper surface of the support structure so that the free end of the seal is disposed radially beyond the periphery of the collar.

BRIEF DESCRIPTION THE DRAWINGS

FIG. 1 is a top isometric view of a fastening clip, according to an embodiment of the disclosure;

FIG. 2 is a front elevational view of the fastening clip of FIG. 1;

FIG. 5 is a side elevational view of the fastening clip of FIG. 1 and a support structure in an uninstalled configuration;

FIG. 6 is a front elevational view of the fastening clip and the support structure of FIG. 5 in an installed configuration;

Figure 7:
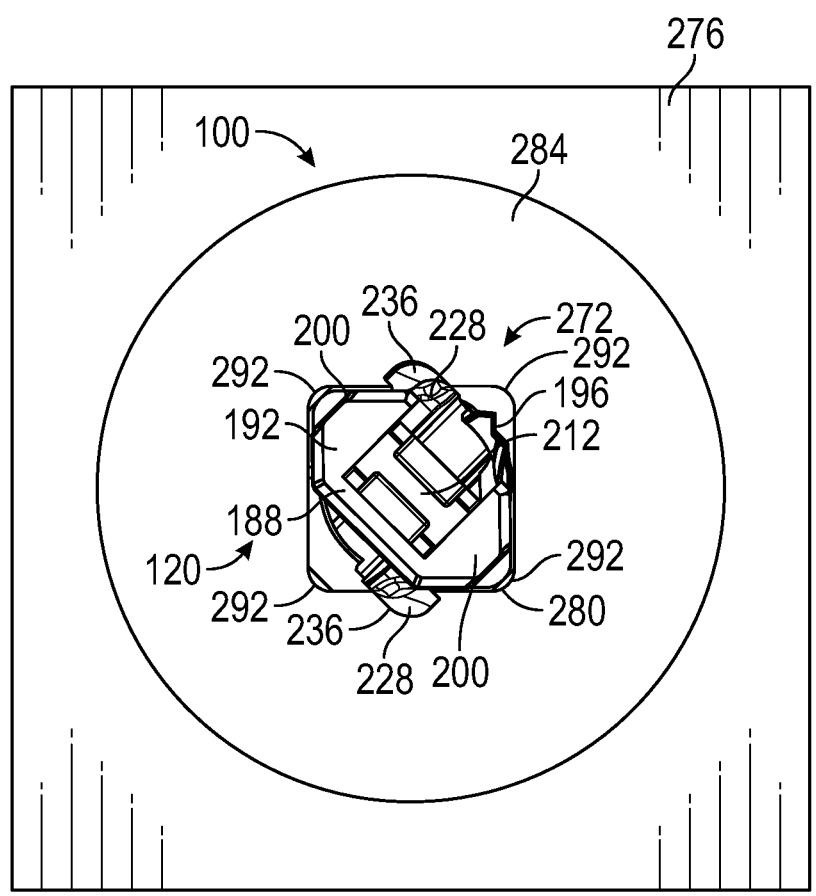
Figure 10:
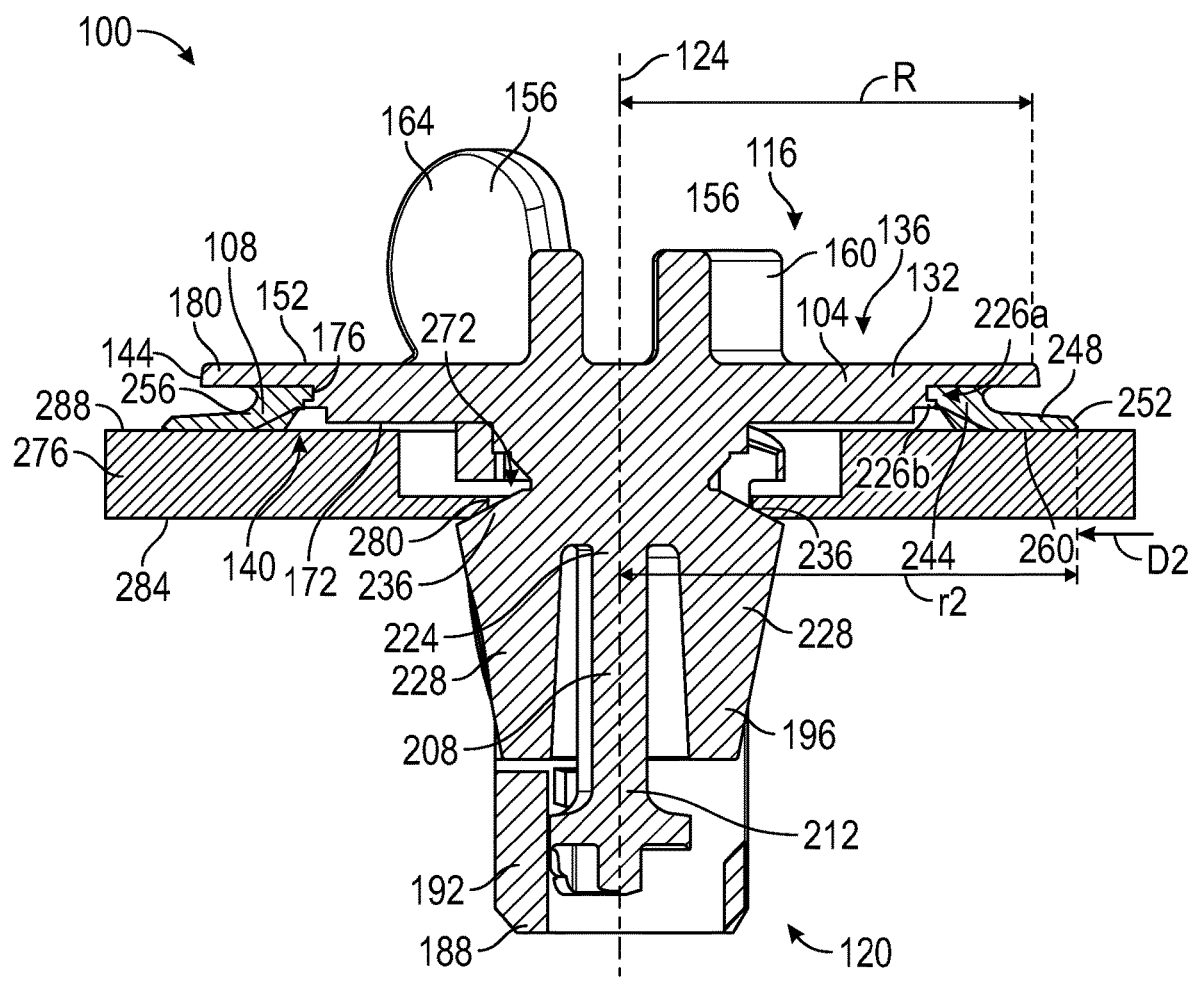
Figure 11:
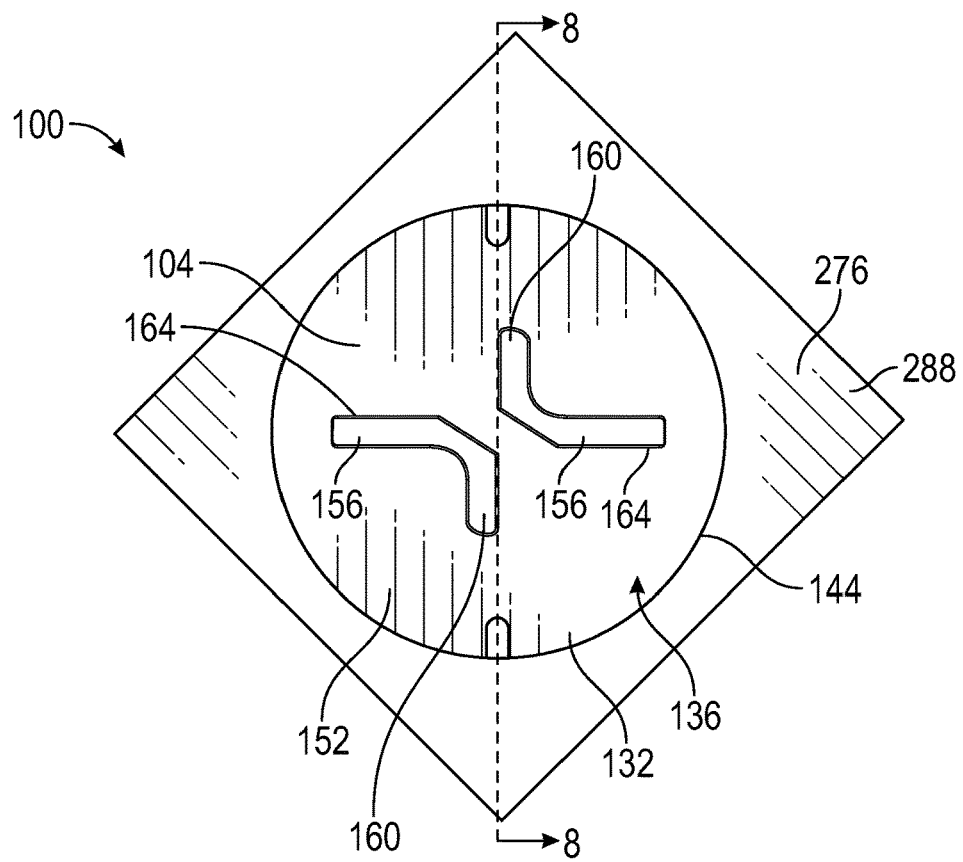
Figure 12:
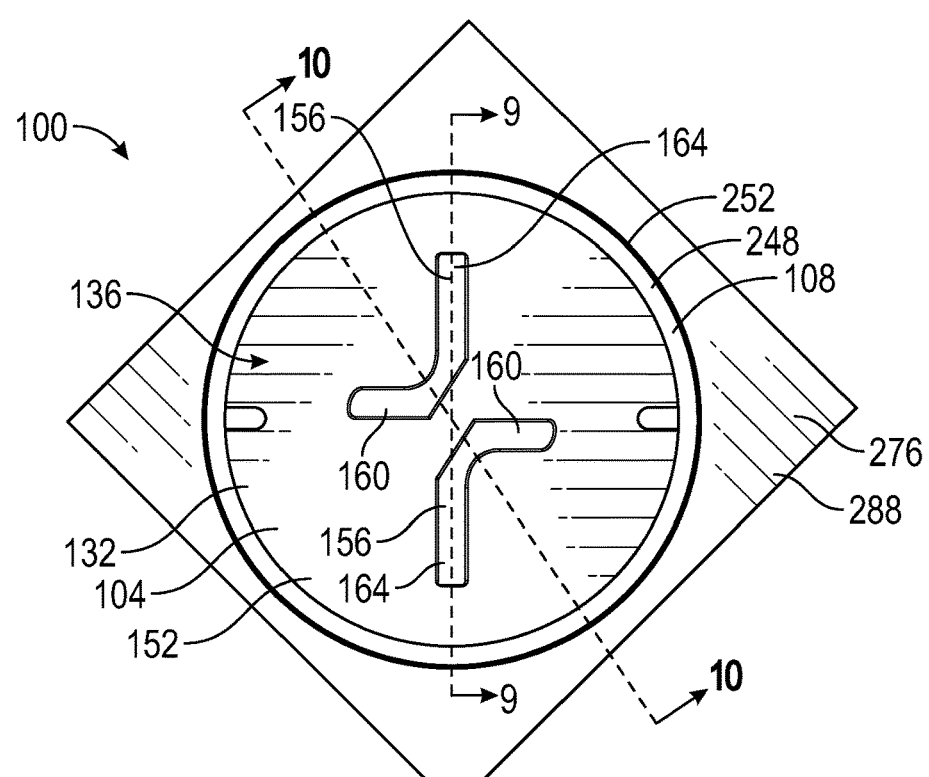

FIG. 7 a bottom plan view of the fastening clip and the support structure of FIG. 6 in the installed configuration;

FIG. 8 is a cross-sectional view of the fastening clip and the support structure of FIG. 5 taken along line 8-8 of FIG. 11;

FIG. 9 is a cross-sectional view of the fastening clip and the support structure of FIG. 6 taken along line 9-9 of FIG. 12;

FIG. 10 is a cross-sectional view of the fastening clip and the support structure of FIG. 6 taken along line 10-10 of FIG. 12;

FIG. 11 is a top plan view of the fastening clip and the support structure of FIG. 5 in the uninstalled configuration; and FIG. 12 is a top plan view of the fastening clip and the support structure of FIG. 6 in the installed configuration.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Conventional fastening clips typically have predefined installation positions. That is, the fastening clip must be positioned at one or two different positions in order to maintain an installed configuration. Indication of the installed configuration may be provided by markings on a structure to which the fastening clip is coupled. However, this type of visual indication is unreliable and limiting. Therefore, a need exists for a fastening clip that provides visual indication to a user identifying a positioning of the fastening clip while enabling various installation orientations.

The present disclosure may alleviate the above-referenced deficiencies of conventional systems, and others. Generally, the present disclosure provides a fastening clip that includes a seal configured to indicate visually when the fastening clip is in an installed/locked configuration. Embodiments of the present disclosure are discussed herein in connection with a torsion clip that is configured to be rotated from an uninstalled configuration to an installed configuration; however, aspects of the present disclosure may be used with a variety of existing fasteners. For example, embodiments of the present disclosure may be used with hole plugs, clips, screws, bushings, anchors, nuts, rivets, grommets, or the like.

FIG. 1 illustrates a fastening clip 100 according to an embodiment of the present disclosure that is configured to provide visual indication of its installation position. More specifically, the fastening clip 100, which includes a clip body 104 and a seal 108, the seal 108 being configured to provide visual indication as the clip 100 moves between an installed configuration and an uninstalled configuration.

Still referring to FIG. 1, the clip body 104 includes a base portion 116 and a fastening portion 120 having a longitudinal, central axis 124. In the embodiment illustrated, the base portion 116 and the fastening portion 120 are integrally formed so that the clip body 104 is a unitary component. However, the clip body in alternative embodiments may comprise one or more discrete components. For example, in some embodiments, the base portion and the fastening portion may be individually fabricated and subsequently fastened or connected. The base portion 116 includes a collar 132 having a first side 136, an opposing second side 140 (see FIG. 3), and a peripheral edge 144. Referring to FIG. 2, the peripheral edge 144 has a radius (R). In some embodiments, the radius (R) may be about 2.5 centimeters ("cm"). In some embodiments, the radius (R) may be about 2.1 cm, about 2.3 cm, about 2.7 cm, about 2.9 cm, or about 3.0 cm. In some embodiments, the radius (R) may be between about 2.0 cm and about 3.0 cm. Further, in some embodiments, the radius (R) may be between about 2.4 cm and about 2.9 cm, between about 2.5 cm and about 2.6 cm, between about 2.6 cm and about 2.8 cm. Moreover, the radius (R) may be less than about 3.0 cm, greater than about 2.0 cm, or greater than about 2.5 cm.

Referring again to FIG. 1, the first side 136 has a first surface 152 with finger engagement tabs 156 disposed thereon. In the embodiment illustrated, the finger engagement tabs 156 include two complementary engagement tabs 156 that are rotationally symmetrical about the central axis 124. Generally, each of the finger engagement tabs 156 includes a support portion 160 and an engagement portion 164. In the embodiment illustrated, the support portion 160 and the engagement portion 164 are arranged such that they extend substantially perpendicularly to each other. In some embodiments, however, the support portion 160 and the engagement portion 164 may be arranged at different angles, such as, e.g., between about 70 degrees and about 90 degrees, between about 20 degrees and about 100 degrees, between about 50 degrees and about 120 degrees, between about 70 degrees and about 150 degrees, between about 80 degrees and about 110 degrees, or between about 90 degrees and about 100 degrees. Further, the engagement portion 164 extends from the first surface 152 of the collar 132 farther than the support portion 160. The engagement portion 164 has a substantially circular profile in the present embodiment, but may have a different profiles in alternative embodiments, such as, e.g., square, rectangular, triangular, oval, or amorphous. The engagement portions 164 are generally configured for engagement by a user's fingers to rotate the clip 100 between the installed configuration and the uninstalled configuration.

Figure 4:
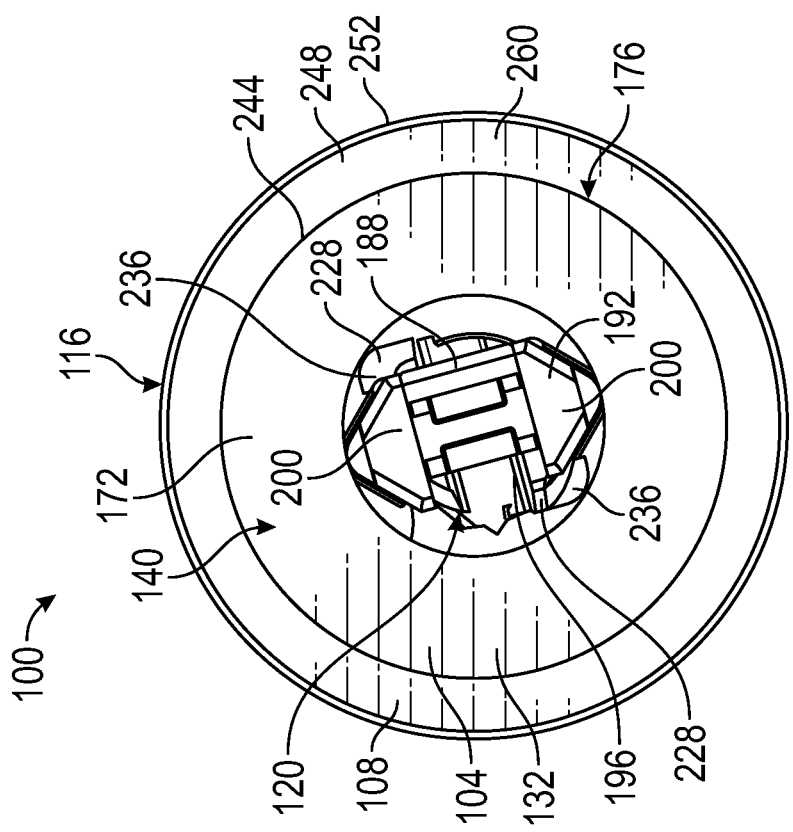
FIG. 4 is a bottom plan view of the fastening clip of FIG. 1.
Figure 3:
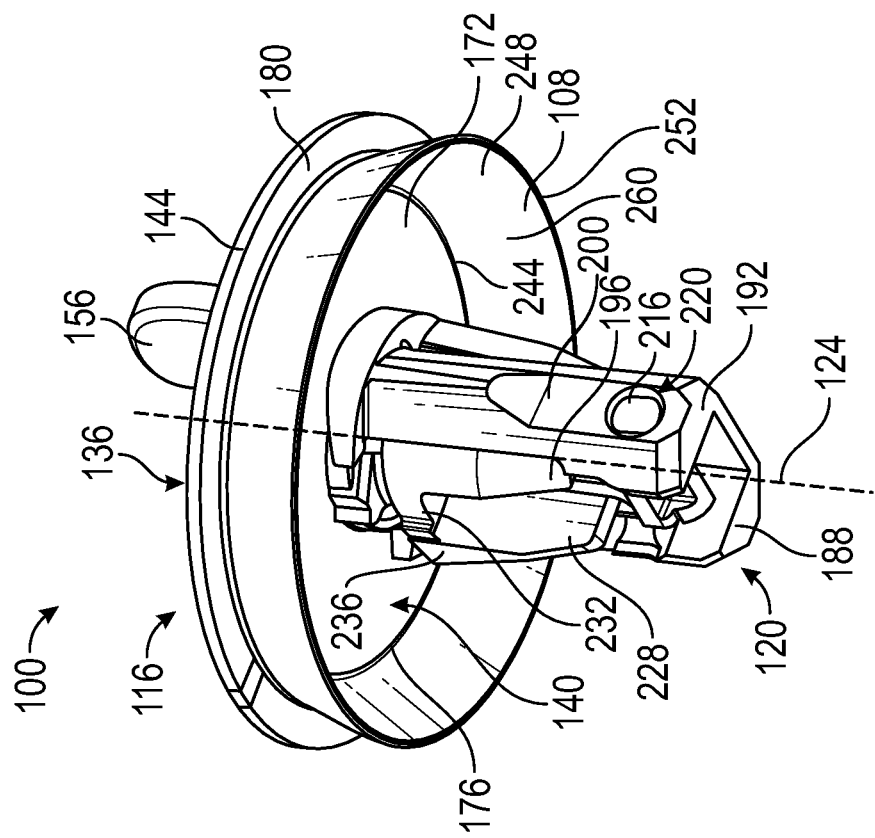
FIG. 3 is a bottom isometric view of the fastening clip of FIG. 1.

With reference to FIG. 3, the second side 140 has a second surface 172 that opposes the first surface 152. The second side 140 includes an annular shoulder 176 that surrounds the second surface 172. The annular shoulder 176 is disposed radially inwardly from the peripheral edge 144, thereby defining a reduced thickness outer annular lip 180. Referring again to FIG. 2, in some embodiments, the peripheral edge 144 defines the radius (R) relative to the central axis 124 of the fastening clip 100, and the annular shoulder 176 is positioned away from the central axis 124 at least 70% of the radius R. In some embodiments, the annular shoulder 176 is positioned away from the central axis 124 at least 75%, at least 80%, at least 85%, or at least 90% of the radius R.

Still referring to FIG. 2, the fastening portion 120 extends from the second surface 172 to an insertion end 188 along the central axis 124 and includes an alignment component 192 and a locking component 196. The alignment component 192 includes a pair of connecting arms 200 that extend from proximate the second surface 172 of the collar 132 to the insertion end 188 and may be symmetrical. The locking component 196 includes a central beam 208 that extends along the central axis 124 to a distal end 212. Turning to FIG. 3, the distal end 212 of the central beam 208 has lateral extensions 216 that may be removably and/or rotatably disposed within openings 220 of the connecting arms 200 proximate the insertion end 188 thereof. A proximate end 224 of the central beam 208 is connected to locking arms 228 by a connecting region 232. The locking arms 228 extend from the connecting region 232 toward the insertion end 188 of the fastening portion 120 and are rotationally symmetrical about the central axis 124. In the embodiment illustrated, each of the locking arms 228 has a generally semi-cylindrical shape, and tapers from adjacent the proximate end 224 toward the distal end 212. Furthermore, each locking arm 228 includes a locking protuberance 236 disposed proximate the proximate end 224 of the central beam 208. The locking protuberance 236 may define the distal-most point of the respective locking arm 228 in a radial direction relative to the central axis 124. As will be described in greater detail below, the locking protuberances 236 are configured to engage a surface of a support structure to lock the fastening clip 100 in the installed configuration. The locking component 196 may be integral with the base portion 116, i.e., the collar 132, whereas the alignment component 192 may be a discrete component that is coupled to the locking component 196 and, accordingly the base portion 116. In some embodiments, one or more of the base portion, the locking component, and the alignment component may include one or more discrete components. Further, in some embodiments, one or more of the base portion, the locking component, and the alignment component may be integrally formed.

Still referring to FIG. 3, the seal 108 is circumferentially disposed around the collar 132. The seal 108 includes a first, proximate end 224 that engages a portion of the collar 132. In the embodiment illustrated, as shown in FIG. 8, the first end 244 of the seal 108 is seated on the annular shoulder 176 of the collar 132 such that the first end 244 is disposed within a receiving region 226a defined between the reduced thickness outer lip 180 and an annular extension 226b that extends radially from the annular shoulder 176. The seal 108 may be secured to the clip body 104 using adhesive, for example. Additionally or alternatively, the seal 108 may be secured via stretch fit. That is, a durometer of the seal 108 may be less than a durometer of the clip body 104 so that the seal 108, which is annular in shape, may be stretched to fit around the annular shoulder 176. Still optionally, the seal 108 may be attached in any other suitable manner.

Returning to FIG. 2, the seal 108 further includes a sealing foot 248 that extends from the first end 244 to a second, distal end 252, the first end 244 and the sealing foot 248 being connected by a living hinge 256. In the present embodiment, the distal end 252 is a free edge. The sealing foot 248 extends from the first end 244 to the second end 252 so that the second end 252 is disposed radially outwardly from the first end 244. The sealing foot 248 includes a sealing surface 260 that projects generally toward the fastening portion 120. Turning again to FIG. 8, in the uninstalled configuration, the sealing surface 260 forms a first angle α with the second surface 172 of the collar 132. Furthermore, in the uninstalled configuration, the second end 252, i.e., the free edge, of the sealing foot 248 is disposed at a first radial distance (r1) from the central axis 124. In some embodiments, the first radial distance (r1) is less than or equal to the radius (R) of the peripheral edge 144. In some embodiments, the first radial distance (r1) is about 99%, about 98%, about 96%, about 95%, about 94%, about 92%, or about 90% of the radius R. In some embodiments, the first radial distance (r1) may be about 1 millimeter ("mm"), about 2 mm, about 3 mm, about 4 mm, or about 5 mm less than the radius R. In some embodiments, the first radial distance (r1) is about 5 mm less than the radius R. Further, in some embodiments, the first radial distance (r1) may be about 1 mm, about 2 mm, about 3 mm, about 4 mm, or about 5 mm greater than the radius R. That is, in some embodiments, the second end 252 may extend radially beyond the peripheral edge 144 in the uninstalled configuration. In some embodiments, the first radial distance (r1) may be determined using the radius (R), a difference factor (D1), and Equation 1 below.

$$r1 = R \pm D1 \qquad (\text{Eq. 1})$$

In some embodiments, the difference factor (D1) is about 0.5 mm, about 0.8 mm, about 1.0 mm, about 1.2 mm, about 1.5 mm, about 1.8 mm, about 2.0 mm, about 3.0 mm, or about 4.0 mm. Thus, for example, the first radial distance (r1) may be between about the radius (R) plus 2.0 mm and about the radius (R) minus 2.0 mm. Additionally, for example, the first radial distance (r1) may be between the radius (R) plus about 4.0 mm and the radius (R) minus about 4.0 mm.

Referring to FIG. 5, the fastening clip 100 is generally configured for insertion into an opening of one or more support structures. In the embodiment illustrated, the fastening clip 100 is shown being inserted into an opening 272 of a support structure 276, the opening 272 generally having a substantially square edge 280 (see FIG. 7). However, the fastening clip 100 may be secured to more than one support structure, component, or panel simultaneously having a hole with different shapes, such as, e.g., oval, rectangular, triangular, diamond, etc. With continued reference to FIG. 7, the fastening clip 100 is inserted into the opening 272 until the locking protuberances 236 engage a lower surface 284 of the support structure 276, and the second end 252 of the seal 108 contacts an upper surface 288 of the support structure 276 (see FIG. 6). Thus, the fastening clip 100 is generally inserted into the opening 272 in a direction defined by the central axis 124 (see FIG. 5). The fastening clip 100 is aligned with the opening 272 so that the connecting arms 200 insert into the opening 272 while aligned with corners 292 of the opening 272 (see FIG. 7). The fastening clip 100 is then further inserted into the opening 272 to compress the seal 108 against the upper surface 288, and the fastening clip 100 may be subsequently rotated about the central axis 124 to secure the clip 100 within the opening 272. More specifically, the locking protuberances 236 are configured to abut/engage the lower surface 284 of the support structure 276 when the clip 100 is rotated about the central axis 124. As the clip is rotated, the connecting arms 200 maintain a rotational positioning of the alignment component 192 as the locking component 196 rotates relative thereto so that the locking protuberances 236 contact the edge 280 of the lower surface 284 of the support structure 276. Thus, in the installed configuration, the locking protuberances 236 engage the lower surface 284 on opposing sides of the opening 272, thereby inhibiting removal of the fastening clip 100 from the opening 272.

Returning to FIG. 6, in the installed configuration, the sealing foot 248 is configured to flex about the living hinge 256 so that the second end 252 thereof translates radially outwardly from its position in the uninstalled configuration. Thus, the second end 252 of the seal 108 is disposed radially outwardly from the peripheral edge 144 and disposed at a second radial distance (r2) when in the installed configuration. The second radial distance (r2) may be determined using the radius R, a difference factor (D2), and Equation 2 below.

$$r2=R+D2 \qquad (Eq. 2)$$

In some embodiments, the difference factor (D2) may be about 1 mm, about 2 mm, about 3 mm, about 4 mm, about 5 mm, about 8 mm, or about 10 mm. Further, in some embodiments, the difference factor (D2) is between about 1 mm and about 10 mm, between about 2 mm and about 6 mm, or between about 1 mm and about 5 mm. In some embodiments, the second radial distance (r2) may be between about 2 mm and about 12 mm, between about 2 mm and about 10 mm, or between about 4 mm and about 8 mm greater than the radius (R). Similarly, the second radial distance (r2) is greater than the first radial distance (0). In some embodiments, the second radial distance (r2) is at least about 3 mm, at least about 5 mm, at least about 6 mm, at least about 8 mm, at least about 10 mm, or at least about 12 mm greater than the first radial distance (r1). Moreover, in some embodiments, the second radial distance (r2) is between about 1 mm and about 10 mm, between about 1 mm and about 6 mm, or between about 2 mm and about 5 mm greater than the first radial distance (r1).

Referring to FIGS. 9 and 10, in the installed configuration, the seal 108 is configured to flex about the living hinge 256 so that the sealing surface 260 contacts or rests on the upper surface 288 of the support structure 276. Therefore, in the installed configuration, the sealing surface 260 forms a second angle β with the second surface 172 of the collar 132 (see FIG. 9), the second angle β being greater than the first angle α of the installed configuration (see FIG. 8). In some embodiments, at least 60%, at least 75%, at least 80%, at least 85%, or at least 90% of a surface area of the sealing surface 260 contacts the upper surface 288 of the support structure 276. In some embodiments, between about 60% and about 90% of the surface area of the sealing surface 260 contacts the upper surface 288 of the support structure 276.

Referring now to FIGS. 11 and 12, therefore, when the fastening clip 100 is rotated from the uninstalled configuration (FIG. 11) to the installed configuration (FIG. 12), the seal 108 provides a visual indication of the position of the clip 100. For example, a user can identify the installed configuration because the seal 108 is substantially visible beyond the peripheral edge 144 from a top plan view of the fastening clip 100 when in the installed configuration, whereas, in the uninstalled configuration, the seal 108 is substantially hidden by the collar 132. More specifically, in the installed configuration, the distal end 252 of the seal 108 extends beyond a profile of the peripheral edge 144, i.e., beyond a footprint defined by the peripheral edge 144. Accordingly, from a top plan view, the seal 108 can be seen radially outwardly from the peripheral edge 144. Generally, the seal 108 is visible along an entire periphery of the peripheral edge 144. However, in some embodiments, the seal 108 is only visible along at least 90%, at least 80%, at least 70%, at least 60%, or at least 50% of the peripheral edge 144. Visual indication of the installed configuration can be visible from additional vantage points as well. For example, from a top isometric view and side elevational view, the seal 108 is still visible radially beyond the peripheral edge 144. In some embodiments, the clip body 104 and the seal 108 may have contrasting colors so that the seal 108 is easily identifiable around the collar 132. As a result, during assembly, a user can position the fastening clip in the installed configuration with certainty, thereby mitigating installation errors and expediting the installation process. Therefore, the fastening clip 100 and other clips according to embodiments of the present disclosure, provide advantages over existing clips, which do not have reliable visual indication capabilities.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

The invention claimed is:

1. A fastening clip for insertion into an opening of one or more support structures, the fastening clip comprising:
a clip body including a base portion and a fastening portion, the base portion having a collar with a first side and an opposing second side, the first side having a first surface, the second side having a second surface surrounded by an annular shoulder of the collar that is disposed radially inwardly from a peripheral edge of the collar, the annular shoulder defining a reduced thickness outer annular lip, and the fastening portion extending from the second side of the collar; and
a seal disposed circumferentially around the collar, the seal having a proximate end engaging the annular shoulder of the collar, and a sealing foot projecting from the proximate end to a free edge such that the free edge is disposed radially outwardly from the proximate end, and a sealing surface of the sealing foot forms a first angle with the second surface of the collar in an uninstalled configuration,
wherein the fastening portion of the clip body includes at least one locking protuberance that is configured to abut a lower surface of a support structure adjacent an opening to lock the fastening clip within the opening of the support structure in an installed configuration,
wherein, in the uninstalled configuration, the free edge of the seal is at a first radial distance from a central axis of the fastening clip, the first radial distance being less than or equal to a radius of the peripheral edge from the central axis, wherein, in the installed configuration, the seal is configured to flex against an upper surface of the support structure in response to applied pressure between the seal and the support structure so that the free edge of the seal is at a second radial distance from the central axis of the fastening clip, and the sealing surface of the sealing foot forms a second angle with the second surface of the collar, the second radial distance being greater than the radius of the peripheral edge, and the second angle being greater than the first angle, wherein the fastening clip is configured to be rotated between the installed configuration and the uninstalled configuration, wherein rotation of the fastening clip from the uninstalled configuration to the installed configuration establishes engagement between the at least one locking protuberance and the lower surface of the support structure and applies pressure between the seal and the upper surface of the support structure, and wherein the seal is configured to flex against the upper surface of the support structure in response to applied pressure between the seal and the lower surface of the support structure so that the free edge of the seal radially translates beyond the peripheral edge of the collar.

2. The fastening clip of claim 1, wherein the clip is a torsion clip.

3. The fastening clip of claim 1, wherein the seal has a durometer lower than a durometer of the clip body.

4. The fastening clip of claim 1, wherein the second radial distance is at least 1 mm greater than the radius of the peripheral edge.

5. The fastening clip of claim 1, wherein, in the installed configuration, at least 70% of the sealing surface of the sealing foot contacts the upper surface of the support structure.

6. A fastening clip for fastening to one or more support structures, the fastening clip comprising:
a clip body including a base portion and a fastening portion, the base portion including a collar having a peripheral edge; and
a circumferential seal disposed at least partially around the collar and including a first end and a sealing foot, the first end engaging the collar, the sealing foot projecting from the first end to a second end such that the second end is disposed radially outwardly from the first end, and the second end being radially aligned with or disposed radially inwardly from the peripheral edge of the collar in an uninstalled configuration,
wherein the fastening portion of the clip body is configured to engage a support structure in an installed configuration, and
wherein, in the installed configuration, the circumferential seal is configured to flex against the support structure in response to applied pressure between the seal and the support structure so that the second end is disposed radially outwardly from the peripheral edge of the collar,
wherein the fastening clip is configured for insertion into an opening of one or more support structures,
wherein the fastening portion includes at least one locking protuberance that is configured to abut a lower surface of a support structure to lock the fastening clip within the opening in the installed configuration, wherein the second end of the seal is configured to engage an upper surface of the support structure, wherein the fastening clip is configured to be rotated between the installed configuration and the uninstalled configuration, wherein rotation of the fastening clip from the uninstalled configuration to the installed configuration establishes engagement between the at least one locking protuberance and the lower surface of the support structure and applies pressure between the seal and the lower surface of the support structure, and wherein the seal is configured to flex against the upper surface of the support structure in response to applied pressure between the seal and the upper surface of the support structure so that the second end of the seal radially translates beyond the peripheral edge of the collar.

7. The fastening clip of claim 6, wherein the collar has a first side and an opposing second side, the first side having a first surface, the second side having second surface, and
wherein the fastening portion extends from the second surface of the collar.

8. The fastening clip of claim 7, wherein the second side of the collar includes an annular shoulder that surrounds the second surface and is disposed radially inwardly from the peripheral edge of the collar, the annular shoulder defining a reduced thickness outer annular lip, and
wherein the first end of the seal engages the annular shoulder.

9. The fastening clip of claim 6, wherein, in an uninstalled configuration, a sealing surface of the sealing foot forms a first angle with the second surface of the collar, and
wherein, in the installed configuration, the sealing surface of the sealing foot forms a second angle with the second surface of the collar, the second angle being greater than the first angle.

10. The fastening clip of claim 9, wherein, in the installed configuration, the seal is flexed so that the surface of the sealing foot contacts the upper surface of the support structure.

11. The fastening clip of claim 10, wherein at least 70% of a surface area of the sealing surface contacts the upper surface of the support structure in the installed configuration.

12. The fastening clip of claim 6, wherein, in the uninstalled configuration, the second end of the seal is at a first radial distance from a central axis of the fastening clip, the first radial distance being less than or equal to a radius of the peripheral edge.

13. The fastening clip of claim 12, wherein, in the installed configuration, the second end of the seal is at a second radial distance from the central axis, the second radial distance being greater than the radius of the peripheral edge.

14. The fastening clip of claim 13, wherein the second radial distance is at least 1 mm greater than the radius of the peripheral edge.

15. The fastening clip of claim 13, wherein the second radial distance is at least 3 mm greater than the radius of the peripheral edge.

16. The fastening clip of claim 6, wherein the seal has a durometer lower than a durometer of the clip body.

17. A fastening clip for insertion into an opening of one or more support structures, the fastening clip comprising:
a clip body including a base portion and a fastening portion, the base portion including a collar having a first side and an opposing second side, the first side having a first surface, the second side having a second surface surrounded by an annular shoulder of the collar that is disposed radially inwardly from a peripheral edge of the collar, the peripheral edge of the collar having a radius measured form a central axis of the fastening clip, the annular shoulder defining a reduced thickness outer annular lip, and the fastening portion extending from the second side of the collar; and a seal disposed circumferentially around the collar, the seal having a proximate end engaging the annular shoulder of the collar, and a sealing foot projecting from the proximate end to a distal end such that the distal end is disposed radially outwardly from the proximate end, and a sealing surface of the sealing foot forms a first angle with the second surface of the collar, wherein the fastening portion of the clip body includes at least one locking protuberance that is configured to engage a lower surface surrounding an opening of a support structure to lock the fastening clip within the opening of the support structure in an installed configuration, wherein, in an uninstalled configuration, the distal end of the seal is at a first radial distance from the central axis of the fastening clip, the first radial distance being less than or equal to the radius of the peripheral edge, wherein, in the installed configuration, the seal is configured to flex against an upper surface of the support structure in response to applied pressure between the seal and the support structure so that the distal end of the seal is at a second radial distance from the central axis, and the sealing surface of the sealing foot forms a second angle with the second surface of the collar, the second radial distance being greater than the radius of the peripheral edge, and the second angle being greater than the first angle, wherein the fastening clip is configured to be rotated between the installed configuration and the uninstalled configuration, wherein rotating the fastening clip from the uninstalled configuration to the installed configuration establishes engagement between the at least one locking protuberance and the lower surface of the support structure and applies pressure between the seal and the upper surface of the support structure, and wherein the seal is configured to flex against the upper surface of the support structure in response to applied pressure between the seal and the upper surface of the support structure so that the distal end of the seal is disposed radially beyond the periphery of the collar.

* * * * *